(12) United States Patent
Baud

(10) Patent No.: US 8,274,334 B2
(45) Date of Patent: Sep. 25, 2012

(54) DETECTION CIRCUIT WITH IMPROVED ANTI-BLOOMING CIRCUIT

(75) Inventor: Laurent Baud, Bevenais (FR)

(73) Assignee: Societe Francaise de Detecteurs Infrarouges—Sofradir, Chatenay Malabry (FR)

( * ) Notice: Subject to any disclaimer, the term of this patent is extended or adjusted under 35 U.S.C. 154(b) by 0 days.

(21) Appl. No.: 12/887,632

(22) Filed: Sep. 22, 2010

(65) Prior Publication Data
US 2011/0068860 A1  Mar. 24, 2011

(30) Foreign Application Priority Data
Sep. 22, 2009 (FR) .................. 09 04519

(51) Int. Cl.
*H03F 3/08* (2006.01)
(52) U.S. Cl. ................................... 330/308
(58) Field of Classification Search ............ 330/308; 250/214 A, 214 AG
See application file for complete search history.

(56) References Cited

U.S. PATENT DOCUMENTS

| 5,198,660 A | 3/1993 | Yokoyama et al. |
| 5,602,511 A * | 2/1997 | Woolaway ............ 330/308 |
| 2003/0034433 A1 | 2/2003 | Fowler |

* cited by examiner

*Primary Examiner* — Khanh V Nguyen
(74) *Attorney, Agent, or Firm* — Oliff & Berridge, PLC

(57) ABSTRACT

The detection circuit comprises a photodiode connected to an input of a capacitive transimpedance amplifier. The circuit comprises an anti-blooming circuit connected between the input and an output of the capacitive transimpedance amplifier. The anti-blooming circuit comprises a field effect transistor connected between the input and output of the capacitive transimpedance amplifier. The transistor is of pMOS type when the input of the capacitive transimpedance amplifier is connected to a cathode of the photodiode. The transistor is of nMOS type when the input of the capacitive transimpedance amplifier is connected to an anode of the photodiode.

11 Claims, 5 Drawing Sheets

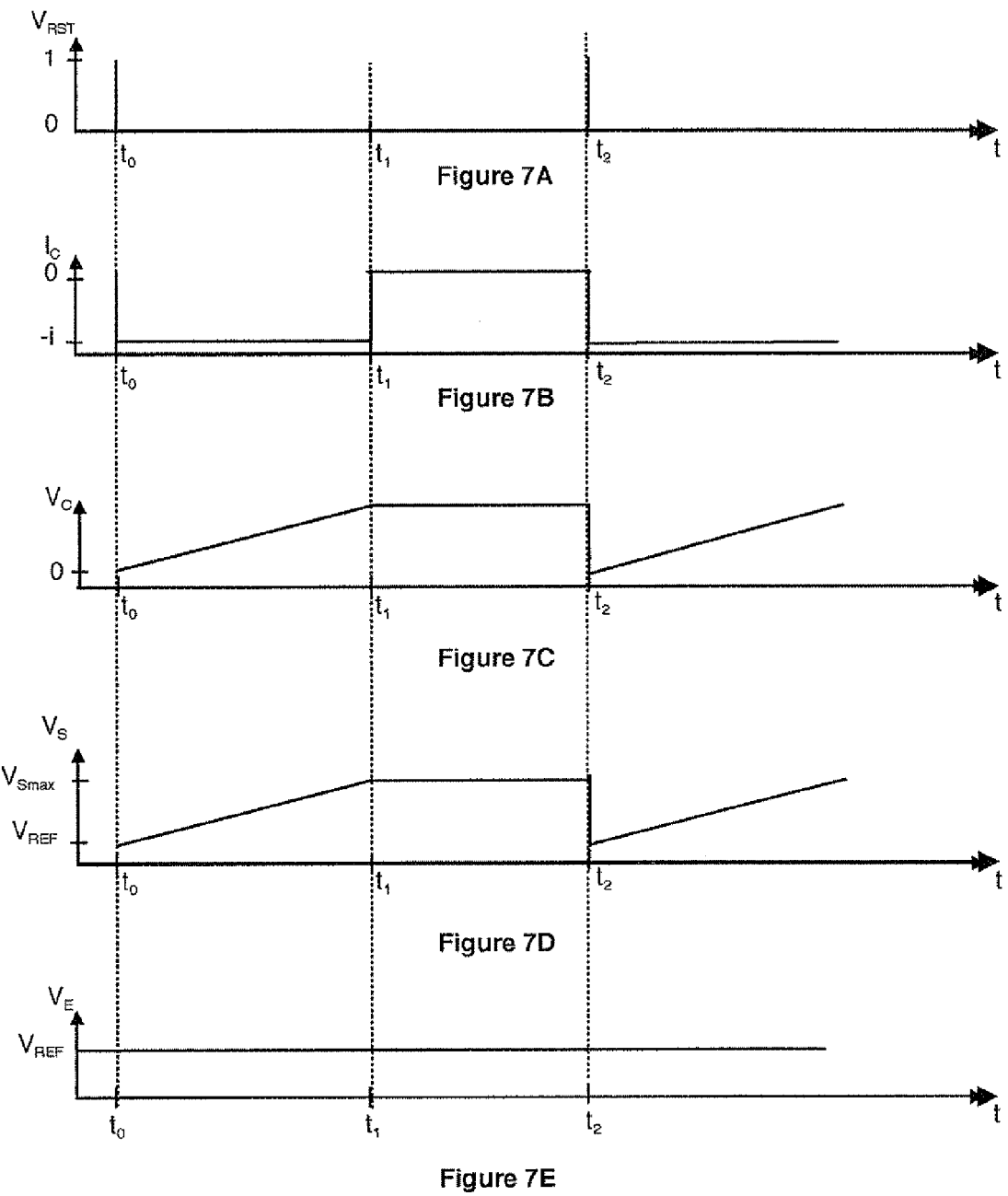

DETECTION CIRCUIT WITH IMPROVED ANTI-BLOOMING CIRCUIT

BACKGROUND OF THE INVENTION

The invention relates to a detection circuit comprising:
a photodiode connected to an input of a transimpedance amplifier,
an anti-blooming circuit connected between the input and an output of the transimpedance amplifier.
The invention also relates to a method for reading the radiation of a detection circuit.

STATE OF THE ART

As illustrated in FIG. 1, in conventional detection circuits, a reverse biased photodiode 1 delivers a current representative of an observed scene. Photodiode 1 delivers this current to an integrator device 2 during a pre-defined period.

Integrator device 2 is formed by a capacitive transimpedance amplifier which comprises an amplifier 3 connected to a capacitor 4. The cathode of photodiode 1 is connected to a first input of amplifier 3 and a substrate voltage $V_{Sub}$ is applied to the anode of photodiode 1. So long as the voltage of the first input of amplifier 3 is higher than substrate voltage $V_{Sub}$, the diode is reverse biased and operates in expected manner.

The current emitted by photodiode 1 is then integrated by capacitor 4 and integrator 2 delivers a voltage Vs representative of the lighting of the observed scene on output by means of capacitor 4.

However, if photodiode 1 is exposed to a too intense light radiation, the current that is integrated in capacitor 4 also becomes high. The voltage difference that exists at the terminals of capacitor 4 modifies voltage $V_E$ of the first input of amplifier 3 and therefore the bias of photodiode 1. In the case where the current delivered by photodiode 1 is very high, the voltage difference at the terminals of photodiode 1 is modified so that the bias of the photodiode is modified. This bias change leads to a modification, an increase, of the photon collection surface in the adjacent photodiodes. Thus, when a photodiode is too intensely illuminated, a blooming effect occurs on the adjacent photodiodes which deliver a current representative of a greater lighting than in reality.

In the document US 2003/0034433, an nMOS transistor 5 is connected between the first input and the output of amplifier 3. The nMOS transistor 5 is connected in parallel to the terminals of capacitor 4. The purpose of this transistor 5 is to prevent the bias of photodiode 1 from being modified by preventing voltage $V_E$ of the first input of amplifier 3 from dropping below a limit value. An anti-blooming voltage $V_{AB}$ is therefore applied to the gate electrode for transistor 5 to turn on before the bias of photodiode 1 is modified. Anti-blooming voltage $V_{AB}$ is chosen such that photodiode 1 is always reverse biased, i.e. it is not forward biased. Anti-blooming voltage $V_{AB}$ is defined with respect to voltage $V_E$ of the first input of amplifier 3.

Thus, as photodiode 1 draws current, amplifier 3 supplies this current via the capacitor, while at the same time keeping the first input of amplifier 3 at the voltage value imposed on the second input. This charging of capacitor 4 results in an increase of the amplifier output voltage $V_S$. From the time output voltage $V_S$ reaches a limit value, voltage $V_E$ present on the first input of amplifier 3 decreases. This decrease takes place until the voltage difference between gate electrode $V_{AB}$ and the first input of amplifier 3 reaches the threshold voltage of transistor 5. Once this threshold voltage has been reached, transistor 5 turns on, the additional charges are evacuated and voltage $V_E$ of the first input of amplifier 3 is no longer modified. Thus, if voltage $V_E$ of the first input reaches a certain predefined threshold, the nMOS transistor turns on and the additional charges are evacuated. Voltage $V_E$ of the first input can therefore no longer change beyond a limit voltage.

The circuit proposed in the document US 2003/0034433 provides a theoretical answer to the general problem of the blooming phenomenon, but this circuit is not satisfactory as the constraints that bear on an industrial use of this architecture are too numerous and make this circuit unusable from an industrial point of view.

OBJECT OF THE INVENTION

The object of the invention is to provide a detection circuit that corrects blooming phenomena and that is easy to implement while at the same time ensuring a reliable and repeatable fabrication for industrial integration.

The device according to the invention is characterized in that the anti-blooming circuit comprises means for comparing the voltage on output from the transimpedance amplifier with a setpoint voltage, said means for comparing being connected to means for applying a feedback current to the input of the transimpedance amplifier when the difference between the output voltage and the setpoint voltage reaches a limit value.

It is a further object of the invention to provide a method for protecting the detection circuit that is easy to implement while at the same time ensuring a reliable and repeatable fabrication for industrial integration.

The method according to the invention is characterized in that it comprises
generation of a current from a reverse biased photodiode to an input of a transimpedance amplifier, the transimpedance amplifier having its input and an output connected by a passive element,
comparison of the output voltage of the transimpedance amplifier with a setpoint voltage,
generation of a feedback current on the input of the transimpedance amplifier when the difference between the output voltage and the setpoint voltage reaches a threshold value so as to freeze the output voltage.

BRIEF DESCRIPTION OF THE DRAWINGS

Other advantages and features will become more clearly apparent from the following description of particular embodiments of the invention given for non-restrictive example purposes only and represented in the appended drawings, in which:

FIGS. 7A to 7E and 8A to 8E represent the progression of voltages or currents for characteristic elements of a circuit according to the invention illustrated in FIGS. 4 and 5.

DESCRIPTION OF A PREFERRED EMBODIMENT OF THE INVENTION

Figure 1:
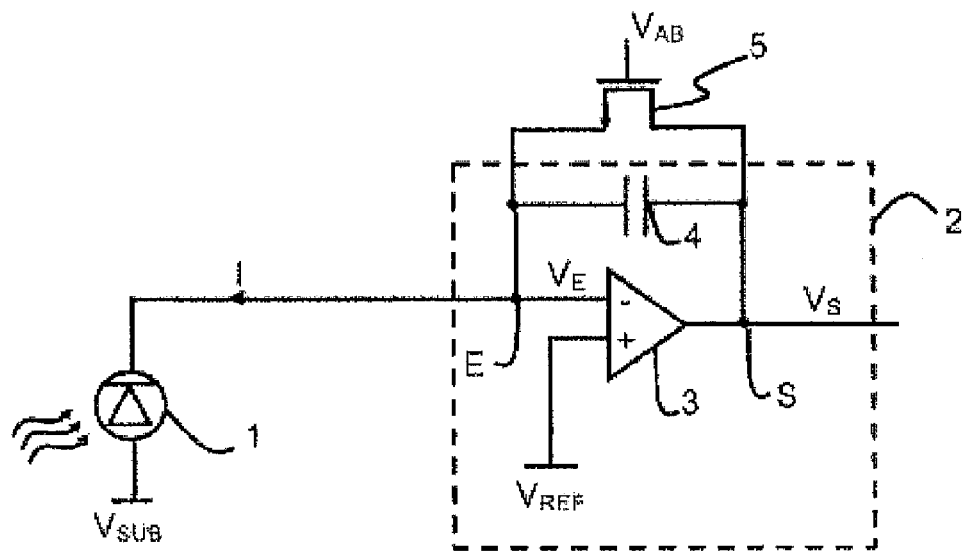
FIG. 1 schematically represents a detection circuit with an anti-blooming circuit according to the prior art, FIG. 2 schematically represents a first embodiment of a detection circuit with an anti-blooming circuit according to the invention, FIGS. 3 to 6 schematically represent various particular embodiments of a detection circuit with an anti-blooming circuit according to the invention.

In the circuit according to the prior art illustrated in FIG. 1, nMOS transistor 5 connected in parallel to the terminals of capacitor 4 has to prevent a blooming phenomenon from occurring on the adjacent photodiodes. Transistor 5 therefore has to prevent photodiode 1 from changing bias, but it must not however prevent capacitor 4 from storing a minimum of charges necessary for the foremost purpose of the detection circuit which is to define the lighting of the observed scene. It is apparent from these two conditions that the anti-blooming voltage $V_{AB}$ applied to the gate electrode of nMOS transistor 5 has to be comprised within a precise range.

According to the first condition, anti-blooming voltage $V_{AB}$ applied to the gate electrode of nMOS transistor 5 has to be lower than the reference voltage $V_{REF}$ applied to the second input of amplifier 3 to which the threshold voltage $V_{th}$ of transistor 5 is added. In this way, nMOS transistor 5 is not permanently conducting, as voltage $V_E$ of the first input of amplifier 3 cannot be greater than $V_{REF}$.

According to the second condition, anti-blooming voltage $V_{AB}$ applied to the gate electrode of nMOS transistor 5 also has to be higher than substrate voltage $V_{Sub}$ applied to the anode of photodiode 1, to which the transistor threshold voltage $V_{th}$ and the minimum voltage $V_{Dmin}$ for which there is still reverse bias of photodiode 1 are added. If anti-blooming voltage $V_{AB}$ is lower than this limit voltage, this means that voltage $V_E$ of the first input of amplifier 3 is lower than substrate voltage $V_{Sub}$, to which minimum bias voltage $V_{Dmin}$ is added. The voltage difference at the terminals of photodiode 1 is therefore lower than minimum bias voltage $V_{Dmin}$ and the bias of photodiode 1 is therefore modified.

These constraints are represented by the following equations 1 and 2:

$$V_{AB} < V_{REF} + V_{th} \quad (1)$$

$$V_{AB} > V_{sub} + V_{th} + V_{Dmin} \quad (2)$$

With regard to the conventional power supply conditions of a detection circuit, it can be observed that the range of voltages $V_{AB}$ that has to be imposed on the gate electrode to prevent the blooming phenomenon is about 30 mV. For example purposes, the reference voltage is equal to 1.1V, substrate voltage $V_{Sub}$ is equal to 1.05V, threshold voltage $V_{th}$ is about 850 mV and minimum bias voltage $V_{Dmin}$ is about 20 mV. The threshold voltage has to be comprised between 1.92 and 1.95V.

The authorized voltage range for anti-blooming voltage $V_{AB}$ is therefore very narrow to ensure correct operation of the circuit. This adjustment range typically corresponds to the dispersion that is usually observed on threshold voltage $V_{th}$ of nMOS transistors. For example purposes, the cold threshold voltage dispersion is about 15 mV give or take one sigma.

It can therefore be observed that integration of this architecture in a photodiode array will lead to formation of cells having permanently conducting transistors (no measurement of the observed scene), cells for which a bias change of the photodiode, and therefore blooming, will occur, and cells for which a gain is effectively achieved on control of the blooming phenomenon. The result is therefore not satisfactory.

The detection circuit was therefore modified to make the latter more robust with respect to the contingencies of its fabrication method. The detection circuit has however kept a reduced surface and an ease of integration which are elements necessary for use thereof in a large number of fields of activity.

Figure 4:
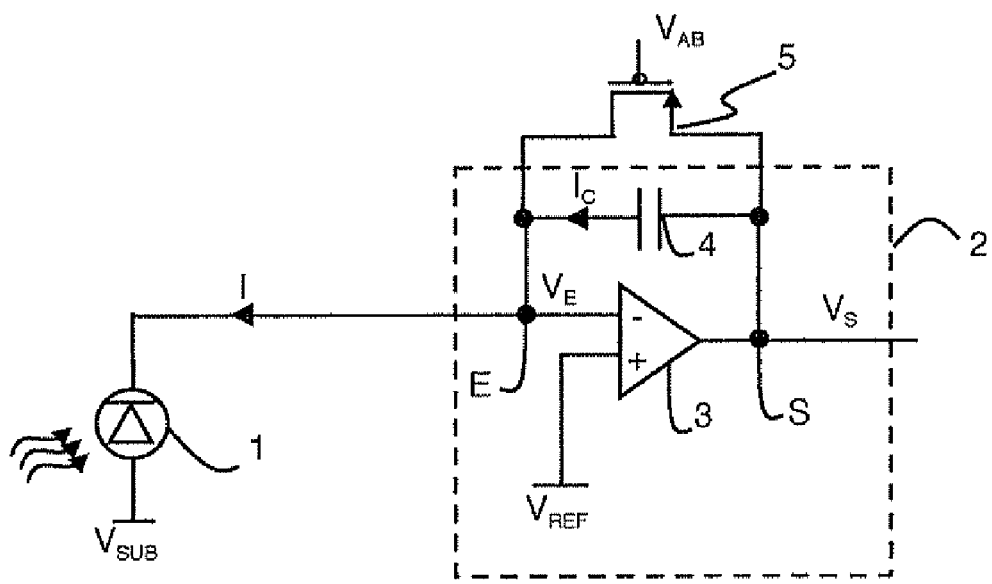
Figure 5:
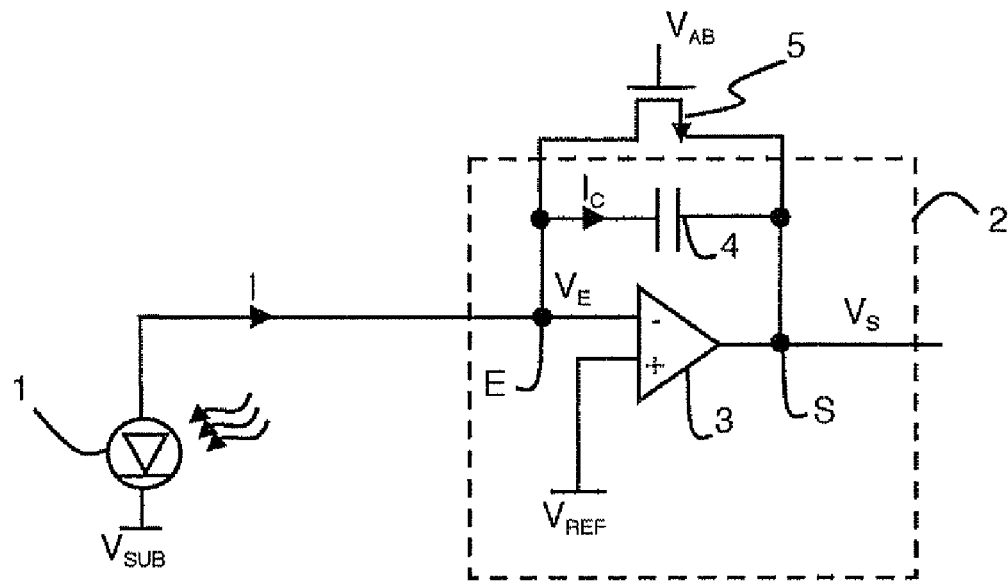
Figure 6:
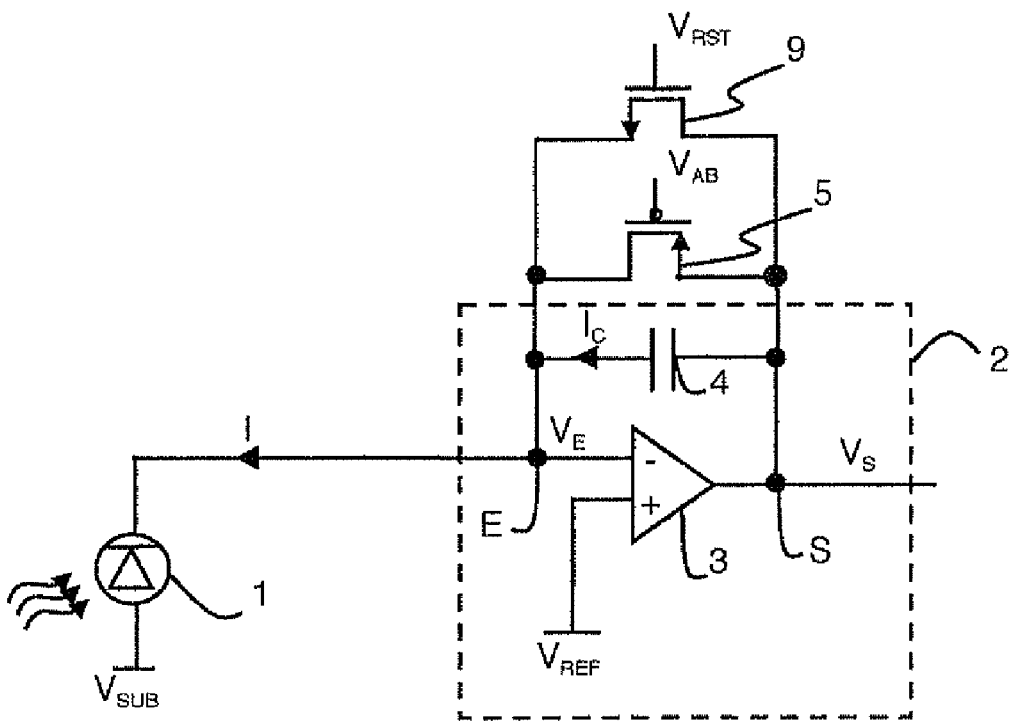

As illustrated in FIGS. 4 to 6, the detection circuit comprises a photodiode 1 which is connected to an integrator device 2. Integrator device 2 comprises a transimpedance amplifier 3. Photodiode 1 is connected to a first input of transimpedance amplifier 3. A reference voltage $V_{REF}$ is applied on a second input of the transimpedance amplifier. In general manner, the detection circuit comprises a photodiode associated with a read circuit.

Figure 3:
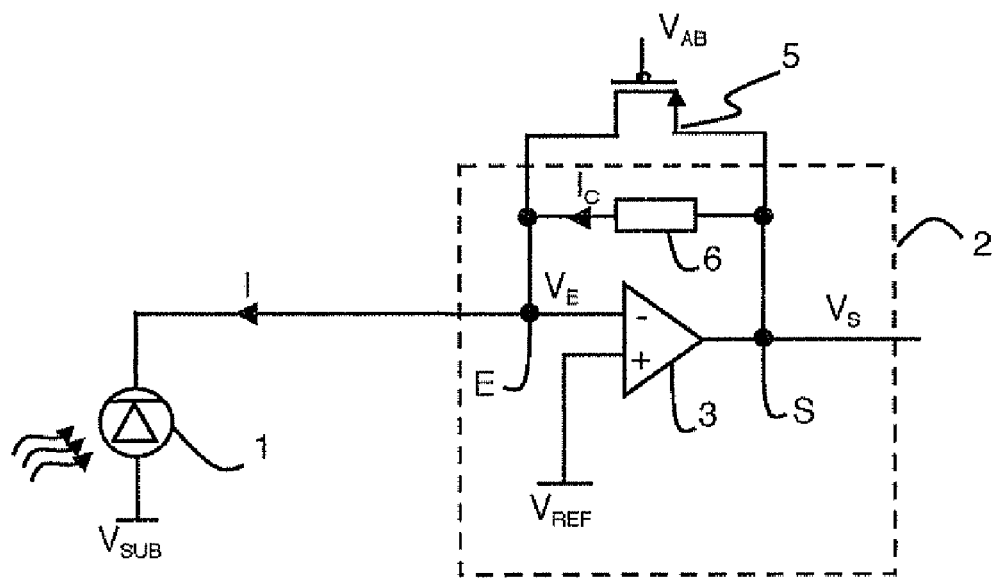

As illustrated in FIGS. 3 and 4, the transimpedance amplifier used can be of resistive type (FIG. 3) or capacitive type (FIG. 4). The remainder of the description relates to a capacitive transimpedance amplifier but the latter can be replaced by a resistive transimpedance amplifier.

The resistive transimpedance amplifier illustrated in FIG. 3 comprises an amplifier 3, typically an operational amplifier, and a resistor 6. Resistor 6 is connected between the first input and the output of amplifier 3. A first electric node E is defined by the connection of photodiode 1 with resistor 6 and the first input of the resistive transimpedance amplifier. A second electric node S is defined by the connection of resistor 6 and the output of the resistive trans-impedance amplifier.

The capacitive transimpedance amplifier illustrated in FIGS. 4 to 6 comprises an amplifier 3, typically an operational amplifier, and a capacitor 4. Capacitor 4 is connected between the first input and the output of amplifier 3. A first electric node E is defined by the connection of photodiode 1 with capacitor 4 and the first input of the capacitive transimpedance amplifier. A second electric node S is defined by the connection of capacitor 4 and of the output of the capacitive transimpedance amplifier.

A substrate voltage $V_{Sub}$ is applied to a first terminal of photodiode 1 whereas the second terminal is connected to the first input of amplifier 3. The voltage of the second terminal of photodiode 1 is therefore equal to the voltage of the first input of amplifier 3, i.e. to voltage $V_E$ of first electric node E. Photodiode 1 is therefore biased between substrate voltage $V_{Sub}$ and voltage $V_E$ of the first input of amplifier 3. Photodiode 1 is reverse biased to supply a current representative of the lighting of the observed scene, substrate voltage $V_{Sub}$ and the voltage $V_E$ of first input of amplifier 3 being chosen accordingly.

The read circuit also comprises an anti-blooming circuit and advantageously a reset circuit. The reset circuit and the anti-blooming circuit are both connected between the first input and the output of the capacitive transimpedance amplifier. They are therefore connected to the terminals of capacitor 4 and therefore to electric nodes E and S.

Figure 2:
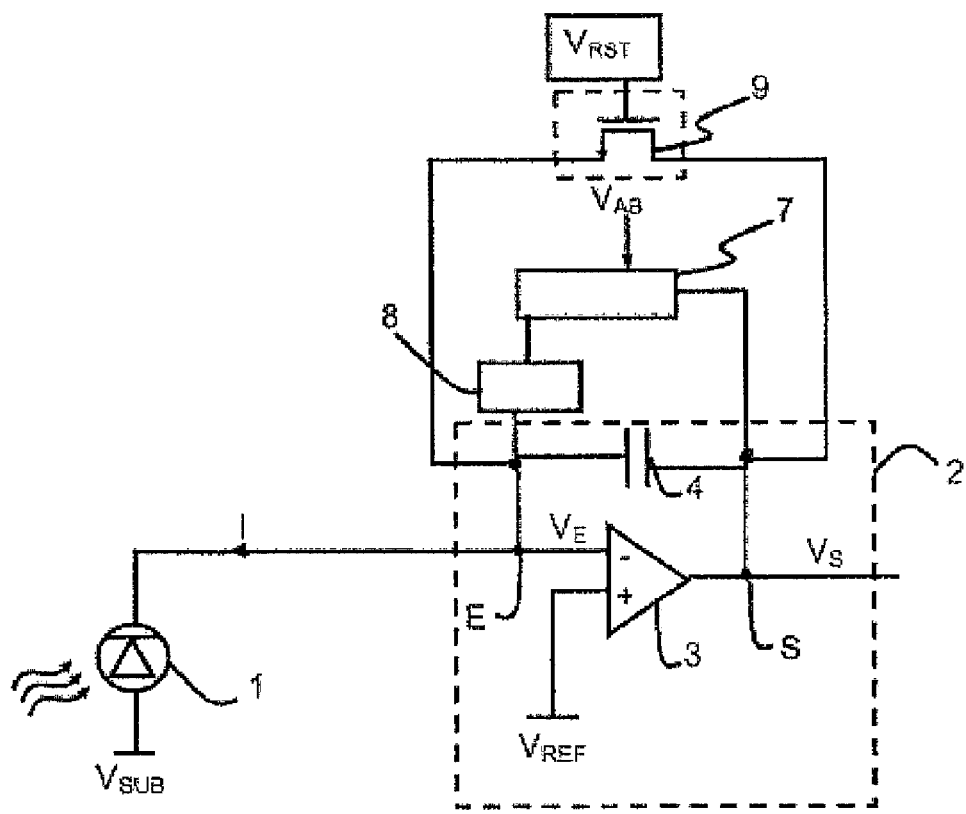

As illustrated in FIG. 2 in general manner, the read circuit comprises means 7 for comparing output voltage $V_S$ of transimpedance amplifier 3 with a setpoint voltage $V_{AB}$. It also comprises means 8 for applying a feedback current on first input E of the transimpedance amplifier when the difference between output voltage $V_S$ and setpoint voltage $V_{AB}$ reaches a threshold, i.e. a limit value that cannot be exceeded. As illustrated in FIG. 2, the read circuit can comprise a polarization terminal enabling setpoint voltage $V_{AB}$ to be defined. This polarization terminal is distinct from the input and input terminals of the amplifier.

In a particularly advantageous embodiment illustrated in FIGS. 3 to 6, the anti-blooming circuit comprises a field effect transistor 5 connected between the first input E and the output S of transimpedance amplifier 3, here a capacitive transimpedance amplifier. Transistor 5 is therefore connected in parallel to the terminals of capacitor 4. Transistor 5 is connected to amplifier 3 in negative feedback.

The reset circuit can also comprise a second transistor 9 connected between the first input and the output of the capacitive transimpedance amplifier. Second transistor 9 is therefore connected in parallel to the terminals of capacitor 4. Second transistor 9 is connected to amplifier 3 in negative feedback.

As illustrated in FIGS. 3 and 4, in a first particular embodiment, transistor 5 of the anti-blooming circuit is a pMOS transistor connected to the terminals of capacitor 4 or of resistor 6. Substrate voltage $V_{Sub}$ is applied to the anode of photodiode 1 whereas the cathode is connected to the first input of the capacitive/resistive transimpedance amplifier. Transistor 5 is therefore connected via its drain terminal to the cathode of photodiode 1, typically at the level of the first input of the capacitive transimpedance amplifier, i.e. of node E. Photodiode 1 being reverse biased, voltage $V_E$ at node E is greater than substrate voltage $V_{Sub}$.

In this embodiment, transistor 5 being of pMOS type, the on or off state of the latter is defined with respect to the voltage difference that exists between the gate electrode and output S of amplifier 3. Anti-blooming voltage $V_{AB}$ applied on the gate electrode of pMOS transistor 5 is defined with respect to the output of the capacitive transimpedance amplifier and no longer with respect to the first input as in the case of the nMOS transistor of the prior art.

In this way, a single condition is necessary to prevent the blooming phenomenon. Transistor 5 simply has to turn on when the value of the voltage on the output of amplifier 3 reaches a limit value, a maximum output value $V_{Smax}$. This condition is represented in equation 3.

$$V_{AB} < V_{Smax} - V_{th} \quad (3)$$

The anti-blooming voltage acts as setpoint voltage with respect to output voltage $V_S$ and makes it possible to define when transistor 5 is off or on. Anti-blooming voltage $V_{AB}$ applied on the gate electrode of pMOS transistor 5 is defined independently from voltage $V_E$ of the first input of amplifier 3 to define the off and on states of transistor 5. Anti-blooming voltage $V_{AB}$ is defined solely with respect to output voltage $V_S$ of amplifier 3. Voltage $V_{AB}$ applied on the gate electrode of transistor 5 has to be lower than maximum voltage $V_{Smax}$ authorized on the output of amplifier 3 from which threshold voltage $V_{th}$ of transistor 5 is subtracted. In other words, transistor 5 is turned off so long as the difference between the setpoint voltage and output voltage $V_S$ has not reached the threshold value $|V_{AB} - V_{Smax}|$ depending on the type of transistor 5 used, NMOS or PMOS.

In the read circuit, the output voltage of amplifier 3 undergoes a modification as capacitor 4 is charged by photodiode 1. Output voltage $V_S$ progresses until it reaches its saturation value, typically about the supply voltage of amplifier 3. Whereas according to the prior art, once the saturation voltage has been reached, it is the voltage of the first input which progresses in turn, the use of a transistor 5 (as illustrated in FIGS. 3 to 6) in which the voltage applied on the gate whereof is defined with respect to output voltage $V_S$ of the capacitive transimpedance amplifier, enables progression of the first input voltage $V_E$ to be prevented.

In so far as the output voltage progresses between reference voltage $V_{REF}$ and the saturation voltage, a maximum output voltage $V_{Smax}$ simply has to be defined that is comprised between these two voltages, preferably close to the saturation voltage. In this way, transistor 5 turns on when the voltage on output is equal to the maximum authorized voltage $V_{Smax}$ i.e. to a voltage close to the saturation voltage, and modification of the bias of photodiode 1 and saturation of the amplifier are thereby prevented. As switching of transistor 5 from off state to on state takes place with respect to the output voltage, and therefore with respect to the voltage difference between the terminals of capacitor 4, there are still charges accumulated in the capacitor when transistor 5 changes from off state to on state. The closer maximum output voltage $V_{Smax}$ is to the saturation voltage, the greater the quantity of charges accumulated in capacitor 4 before switching. Thus, with a maximum output voltage substantially equal to the saturation voltage, advantage is taken of the greatest possible range in use of capacitor 4. Maximum output voltage $V_{Smax}$ is therefore advantageously chosen just below the saturation voltage of the output so as to take full advantage of the range of capacitor 4.

Switching of a transistor 5 from off state to on state being defined with respect to the output voltage, the criticality of the variations of threshold voltage $V_{th}$ that are linked to the fabrication method is lessened. Transistor 5 simply has to switch to an on state at latest when output voltage $V_S$ reaches the saturation voltage.

Anti-blooming voltage $V_{AB}$ is therefore chosen between reference voltage $V_{REF}$ and maximum output voltage $V_{Smax}$. In this way, the lower limit $V_{REF}$ takes account of the variations on threshold voltage $V_{th}$, linked to the fabrication method and the upper limit $V_{Smax}$ is chosen far enough from the saturation voltage on output to also take account of the variations on threshold voltage $V_{th}$ linked to the fabrication method.

Thus, in other words, according to the embodiments, so long as the difference between output voltage $V_S$ of the amplifier and setpoint voltage $V_{AB}$ is lower or higher than a threshold, transistor 5 is in an off state. Once the threshold has been reached, i.e. here when the output voltage reaches $V_{Smax}$, transistor 5 turns on.

Operation of the circuit can be described schematically in the following manner in FIGS. 7A to 7E. At a time $t_0$, the reset circuit short-circuits the terminals of capacitor 4 which therefore becomes discharged. FIG. 7A illustrates operation of the reset circuit in logic manner. Resetting of capacitor 4 is performed by means of a pulse (duration in high state 1) at a reset voltage $V_{RST}$. Reset voltage $V_{RST}$ is applied to a second transistor 9 which is connected in parallel to the terminals of capacitor 4 which then turns on. Voltage difference $V_C$ at the terminals of capacitor 4 is then zero (FIG. 7C). Photodiode 1 is reverse biased between substrate voltage $V_{Sub}$ (applied to the anode in FIGS. 2 to 4) and voltage $V_E$ of the first input of the capacitive transimpedance amplifier, typically reference voltage $V_{REF}$ applied on the second input of amplifier 3.

At time $t_0$, voltage $V_E$ of the first input of the capacitive transimpedance amplifier is therefore equal to reference voltage $V_{REF}$ (FIG. 7E) and photodiode 1 is biased between $V_{REF}$ and $V_{Sub}$, i.e. at voltage $V_{REF} - V_{Sub}$. Voltage $V_S$ on output of the capacitive transimpedance amplifier is equal to $V_{REF}$ (FIG. 7D). Output voltage $V_S$ being equal to reference voltage $V_{REF}$, anti-blooming circuit transistor 5 is off and does not let any current pass. All the current I emitted by photodiode 1 flows via the reset circuit. The charging current of capacitor $I_c$ is therefore equal to 0.

Between time $t_0$ and time $t_1$, photodiode 1 delivers a current I representative of the observed scene, here in schematic manner a constant current. The charges composing this current are stored in capacitor 4 and give rise to a voltage difference $V_c$ at the terminals of capacitor 4. This voltage difference increases progressively as capacitor 4 is charged. This results in a progression of output voltage $V_S$ of the capacitive transimpedance amplifier, the output voltage increasing with charging of capacitor 4. In its normal operation, amplifier 3 forces voltage $V_E$ of the first input to be equal to the voltage of the second input, here reference voltage $V_{REF}$. Between times $t_0$ and $t_1$, voltage $V_E$ of the first input and therefore the voltage difference at the terminals of photodiode 1 are constant. Only output voltage $V_S$ progresses. During this period, no current flows through transistor 5.

At time $t_1$, output voltage $V_S$ reaches maximum output voltage $V_{Smax}$, i.e. the difference between the output voltage and the setpoint voltage reaches the predefined threshold. Transistor 5 turns on and the current now flows from photodiode 1 through transistor 5. The additional charges sent by photodiode 1 are not stored by capacitor 4. The voltage difference at the terminals of the capacitor is therefore constant from $t_1$ onwards. The photodiode current corresponds to the sum of the current flowing though transistor 5 and of the current of capacitor 4.

As the output voltage of amplifier 3 does not reach the saturation voltage (FIG. 7D), there is no progression of voltage $V_E$ of the first input of amplifier 3 (FIG. 7E) and modification of the bias of photodiode 1 is prevented.

Capacitor 4 is then discharged by means of reset circuit at the end of the measuring period at time $t_2$. The circuit then reverts to the conditions of time $t_0$.

Figures 8A, 8B, 8C, 8D, 8E:
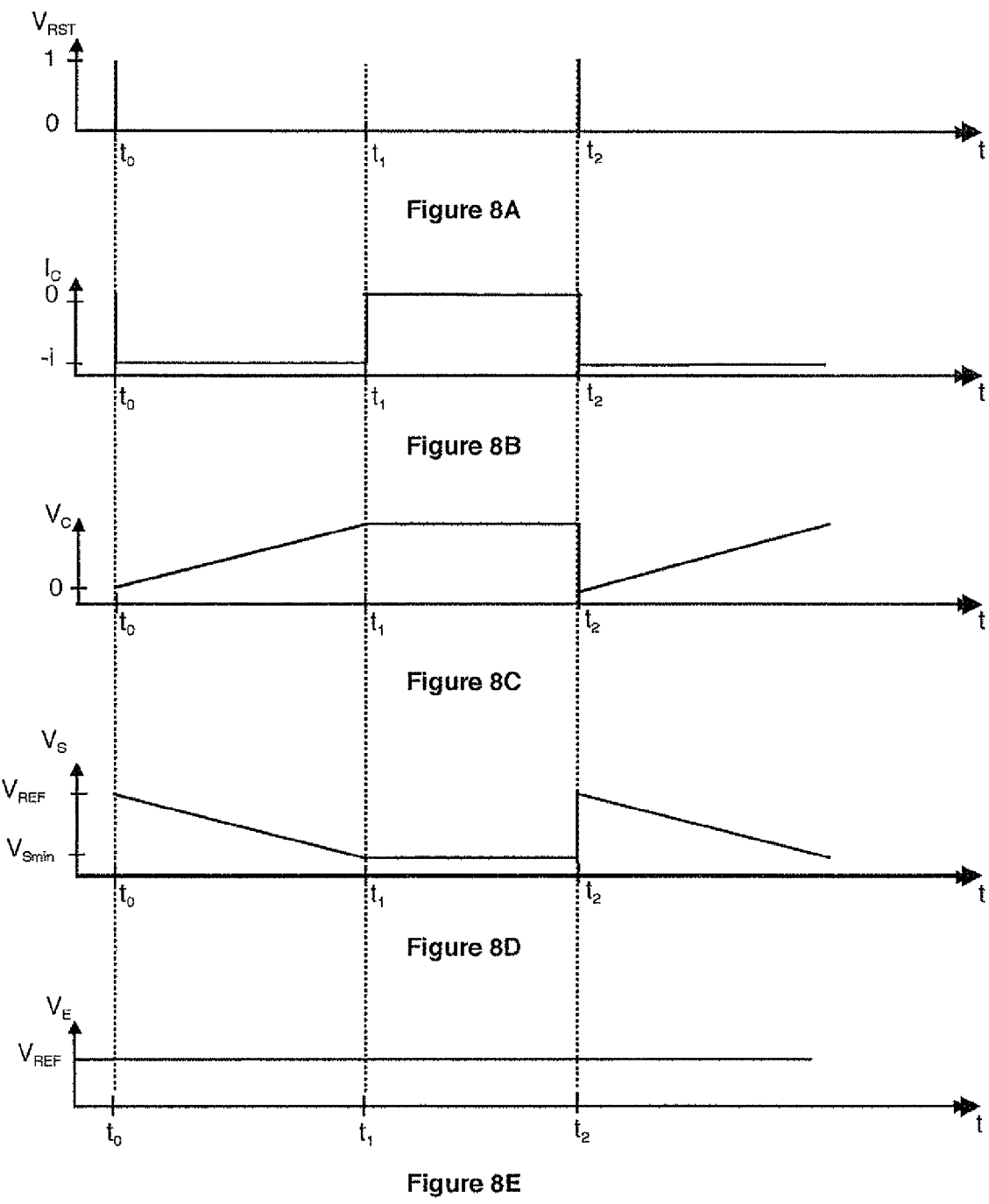

As illustrated in FIG. 5, in a second embodiment, anti-blooming circuit transistor 5 is an nMOS transistor connected to the anode of photodiode 1 by means of the first input of the capacitive transimpedance amplifier. In this particular embodiment, the output voltage progresses from reference voltage $V_{REF}$ which is imposed on the second input to the minimum output voltage, the reference voltage being higher than the threshold voltage. In this embodiment, the output voltage decreases with the charge of capacitor 4. The operating principle is identical to the previous operating mode. For example purposes, the reference voltage is equal to 2.2V and the minimum output voltage is equal to 0.1V. FIGS. 8A to 8E represent the progression of electrical parameters of the detection circuit according to the embodiment of FIG. 5. FIGS. 8A to 8C and 8E are identical to FIGS. 7A to 7C and 7E, only output voltages $V_S$ of FIGS. 7D and 8D are different. The output voltage progresses between reference voltage $V_{REF}$ and minimum output voltage $V_{Smin}$.

In general manner, photodiode 1 delivers a current representative of the observed scene on input E of transimpedance amplifier 3. This current on input E leads to a voltage difference arising between input terminal $V_E$ and output terminal $V_S$ of transimpedance amplifier 3, as these two terminals are connected by a passive element such as a resistor or a capacitor. Output voltage $V_S$ is compared with a setpoint voltage $V_{AB}$ via means 7 for comparing. When the difference between output voltage $V_S$ and setpoint voltage $V_{AB}$ (or the opposite depending on the embodiment) reaches a threshold value, a feedback current is generated on input E of trans-impedance amplifier 3. This feedback current prevents the voltage difference between input terminal E and output terminal S of transimpedance amplifier 3 from increasing.

In a particular case of the embodiments of the circuits illustrated in FIGS. 3 to 5, the anti-blooming circuit only comprises one transistor 5 connected between first input terminal E and output terminal S of amplifier 3 and an application circuit of anti-blooming voltage $V_{AB}$ on the gate of transistor 5 (not shown). This embodiment is advantageous as it is robust and compact.

In a particular embodiment illustrated in FIG. 6, anti-blooming circuit transistor 5 is of opposite type to second transistor 9 of the reset circuit. The two transistors 5 and 9, of opposite types, are therefore both connected in parallel to the terminals of capacitor 4. In this particular embodiment illustrated in FIG. 6, anti-blooming circuit transistor 5 is of pMOS type and second transistor 9 of reset circuit is of nMOS type, this embodiment being particularly advantageous. The nMOS transistor allows a more reliable resetting of the voltage difference at the terminals of capacitor 4 as the voltage range necessary to maintain the transistor in an off state is linked to the voltage applied on the first input of the capacitive transimpedance amplifier which is constant. Resetting of the voltage difference between the terminals of capacitor 4 is thereby ensured whatever the level of output voltage $V_S$ of the capacitive transimpedance amplifier. It is also possible to change the type of transistors 5 and 9 in an alternative embodiment.

In another particular embodiment, transistor 5 of the anti-blooming circuit is of the same type as second transistor 9 of the reset circuit. Advantageously, in this embodiment, a single transistor is used for the two circuits, second transistor 9 being formed by transistor 5. The embodiments illustrated in FIGS. 3 to 5 can therefore represent a read circuit that comprises an anti-blooming circuit and a reset circuit materialized by one and the same transistor connected to the terminals of capacitor 4. The gate electrode of this transistor 5 then simply has to be connected to an application circuit of reset bias $V_{RST}$ and to an application circuit of anti-blooming bias $V_{AB}$.

The fact that the anti-blooming circuit comprises a transistor connected between the first input and the output of the capacitive transimpedance amplifier is particularly advantageous, as it enables a compact circuit to be obtained. Furthermore, if the anti-blooming and reset circuits share the same transistor, this results in a very great space saving which enables the to integration density to be increased. It is however possible to use more complex circuits provided transistor 5 is connected in parallel to the terminals of the capacitor.

The invention claimed is:

1. A detection circuit comprising a photodiode connected to an input of a transimpedance amplifier, an anti-blooming circuit connected between the input and an output of the transimpedance amplifier, the anti-blooming circuit comprising:
    a comparator configured to compare an output voltage of the transimpedance amplifier with a setpoint voltage, and
    circuitry configured to apply a feedback current to the input of the transimpedance amplifier according to a comparison between the output voltage of the transimpedance amplifier and the setpoint voltage.

2. The detection circuit according to claim 1, wherein the anti-blooming circuit comprises:
    a field effect transistor of PMOS type connected between the input and output of the transimpedance amplifier and connected to a cathode of the photodiode, the field effect transistor being arranged so that a feedback current flows between the input and the output of the transimpedance amplifier,
    a source voltage connected to an additional input of the transimpedance amplifier and configured to apply a reference voltage to the additional input, and
    a device for applying the setpoint voltage on the control electrode of the field effect transistor, the setpoint voltage being between a supply voltage and the reference voltage applied.

3. The detection circuit according to claim 1, wherein the anti-blooming circuit comprises:
    a field effect transistor of NMOS type connected between the input and output of the transimpedance amplifier and connected to an anode of the photodiode,
    a source voltage connected to an additional input of the transimpedance amplifier and configured to apply a reference voltage to the additional input, the field effect transistor being arranged so that a feedback current flows between the input and the output of the transimpedance amplifier, and a device for applying the setpoint voltage on a control electrode of the transistor, the setpoint voltage being between a supply voltage and the reference voltage.

4. The detection circuit according to claim 1, further comprising a reset circuit comprising a field effect transistor connected between the input and output of the transimpedance amplifier and configured to short-circuit the input with the output.

5. The detection circuit according to claim 1, wherein the transimpedance amplifier is a capacitive transimpedance amplifier.

6. The detection circuit according to claim 1, wherein the transimpedance amplifier is a resistive transimpedance amplifier.

7. The detection circuit according to claim 2, further comprising a reset circuit comprising an additional field effect transistor of NMOS type connected between the input and output of the transimpedance amplifier and configured to short-circuit the input with the output.

8. The detection circuit according to claim 3, further comprising a reset circuit comprising an additional field effect transistor of PMOS type connected between the input and output of the transimpedance amplifier and configured to short-circuit the input with the output.

9. The detection circuit according to claim 2, further comprising a reset circuit comprising an additional field effect transistor of PMOS type connected between the input and output of the transimpedance amplifier and configured to short-circuit the input with the output.

10. A method for reading radiation of a detection circuit comprising:
generating a current from a reverse biased photodiode to an input of a transimpedance amplifier, the transimpedance amplifier having an input and an output connected by a passive element,
comparing an output voltage of the transimpedance amplifier with a setpoint voltage, and
generating a feedback current on the input of the transimpedance amplifier according to the comparison between the output voltage of the transimpedance amplifier and the setpoint voltage so as to freeze the output voltage.

11. The method for reading according to claim 10, wherein generating the feedback current comes from a transistor connecting the input to the output of an operational amplifier of the transimpedance amplifier switching to an on state.

* * * * *